United States Patent [19]

Brock et al.

[11] Patent Number: 5,612,095
[45] Date of Patent: Mar. 18, 1997

[54] PROCESS FOR MULTICOAT LACQUERING

[75] Inventors: Thomas Brock, Hürth; Klaus Wandelmaier, Wuppertal, both of Germany

[73] Assignee: Herberts GmbH, Wuppertal, Germany

[21] Appl. No.: 653,078

[22] Filed: Mar. 5, 1996

Related U.S. Application Data

[63] Continuation of Ser. No. 262,403, Jun. 20, 1994, abandoned.

[30] Foreign Application Priority Data

Jun. 29, 1993 [DE] Germany .......................... 43 21 534.3

[51] Int. Cl.⁶ ................................ B05D 1/36; B05D 7/14
[52] U.S. Cl. ........................................ 427/407.1; 427/409
[58] Field of Search ................................ 427/409, 412.1, 427/407.1

[56] References Cited

U.S. PATENT DOCUMENTS

| | | | |
|---|---|---|---|
| 4,523,003 | 6/1985 | Bezwada | 427/388.2 |
| 4,542,070 | 9/1985 | Ohtani et al. | 427/410 |
| 4,794,154 | 12/1988 | Benefiel | 427/385.5 |
| 5,279,862 | 1/1994 | Corcoran et al. | 427/412.1 |
| 5,283,084 | 2/1994 | Lau | 427/409 |
| 5,284,918 | 2/1994 | Huynh-Tran et al. | 427/388.1 |
| 5,334,420 | 8/1994 | Hartung et al. | 427/407.1 |
| 5,342,882 | 8/1994 | Göbel et al. | 427/388.4 |
| 5,368,944 | 11/1994 | Hartung et al. | 427/407.1 |
| 5,370,910 | 12/1994 | Hille et al. | 427/407.1 |

*Primary Examiner*—Diana Dudash
*Attorney, Agent, or Firm*—Schweitzer Cornman & Gross

[57] ABSTRACT

A process is described for the production of a multicoat lacquer finish by application of a base coat layer of an aqueous coating agent to a substrate and subsequent application of a layer of a clear coat containing an organic solvent, that leads to coatings with excellent hardness and gloss. For this purpose, for the production of the base coat layer an aqueous coating agent is applied that contains, in addition to water, one or more pigments, and optionally one or more organic solvents, neutralizing agents and customary lacquer additives, as binder a combination of:

I) 99.5 to 85 wt % of one or more aqueous, physically drying polyurethane binders and II) 0.5 to 15 wt % of one or more polyisocyanates, liquid at room temperature or liquefied by organic solvents, with more than one free isocyanate groups wherein the wt % of components I) and II) both relate to their solids content and add up to 100 wt % and wherein component II) is added to the coating agent shortly before its application.

7 Claims, No Drawings

PROCESS FOR MULTICOAT LACQUERING

This is a continuation application of U.S. Ser. No. 08/262,403, filed Jun. 20, 1994 now abandoned, The invention relates to a process for the production of multicoat lacquer finishes by application of a base coat layer of aqueous coating agents to a substrate and subsequent application of a clear coat based on organic solvents. Coatings with excellent gloss and outstanding hardness are obtained.

It is endeavoured, on grounds of environmental protection, noticeably to reduce the solvent emission during coating processes. The solvent emission is particularly high during the application of base coats, on account of the low-solids formulations. It is therefore particularly important to replace conventional, solvent-containing base coats by aqueous systems.

Physically drying water-based coating agents, in particular for the production of metallic coatings and for the production of solid-colour coatings, are described in DE-A-41 15 015 and DE-A-41 15 042. The metallic lacquers contain at least one binder based on polyurethanes containing carbonate groups, having a number-average molecular weight (Mn) of 70,000 to 500,000 and other polyurethanes with an Mn of 20,000 to 60,000. For the production of solid-colour coatings, binder mixtures are used based on polyurethanes containing carbonate groups having a glass transition temperature (Tg) below 0° C. and unsaturated reaction products of carboxy-functional polycondensates with ethylenically unsaturated monomers with a glass transition temperature above 0° C.

Physically drying coating agents of this kind, owing to their ability to cure at room temperature or with little heating, for example at up to 60° C., are particularly suitable for repair lacquering of motor vehicles. After application, they can be coated with transparent finishing coats. The coating can be carried out wet-on-wet, after a short flashing-off or after drying of the layer of base coat. Customary transparent lacquers from the motor vehicle sector are used as clear coat. These are in particular two-component lacquers based on acrylate/isocyanate in conventional formulations.

It has previously been generally described how in the case of purely physically drying aqueous polyurethane dispersions, the properties of the films obtained can be improved by the addition of special dispersible polyisocyanates (Lacke und Farben, number 10/1992, Information BAYER). It is not indicated what special polyisocyanates are used in this connection and under what conditions actual properties can be improved.

Aqueous dispersions of anionic, cationic or non-ionic hydrophilically modified polyurethanes are described in DE-A-27 88 442. For modification of the application properties there are added to these aqueous dispersions, organic diisocyanates liquid at room temperature with a maximum average molecular weight of 400 in an amount of 1.5–80 wt % or, in case of the use of hexamethylene diisocyanate, in an amount of 1.5–5 wt %, relative to the total solids content of the dispersion. The diisocyanates must be added with intermixing at a temperature between 0° and 50° C. The temperature must be maintained until at least 50% of the isocyanate groups of the diisocyanate have reacted. Subsequently, the reaction is optionally completed by heating to up to 100° C. According to the description, the accurate maintenance of the temperature conditions mentioned is essential for achieving the effect aimed at, a coating of the latex particles present in the dispersion with a polyurea layer. These dispersions are used predominantly for the coating of leather, paper and textiles, whose properties of tensile strength, abrasion resistance, water- and high-temperature-stability and handle are improved.

It is a disadvantage, however, of the previously known multicoat structures using aqueous base coats based on physically drying polyurethanes that after the overcoating with clear coat an inadequate hardness of the base coat layer and therewith of the whole finish layer results. The base coat remains too soft, in particular at fairly high layer thicknesses (of about 40 μm and more). The gloss and water resistance obtained also remain unsatisfactory.

It is therefore the object of the invention to prepare multicoat finishes using aqueous base coats (solid and metallic) and overcoating with solvent-containing clear coats, without in doing so having to accept losses in gloss and hardness by comparison with the use of solvent-containing base coats.

It has become evident that this object can be achieved by the process, forming one subject of the invention, for the production of a multicoat lacquer finish by application of a base coat layer of an aqueous coating agent to a substrate and subsequent application of a layer of a clear coat containing an organic solvent, that is characterised in that for the production of the base coat layer an aqueous coating agent is applied that contains, in addition to water, one or more pigments, and optionally one or more organic solvents, neutralizing agents and customary lacquer additives, as binder a combination of:

I) 99.5 to 85 wt % of one or more aqueous, physically drying polyurethane binders with such a content of OH groups and acid functions that the OH number 10 and the acid number 30 are not exceeded, of which 10 to 50 wt %, relative to the solids weight of component I), can be replaced by one or more unsaturated reaction products of carboxy-functional polycondensates with ethylenically unsaturated monomers and II) 0.5 to 15 wt % of one or more polyisocyanates, liquid at room temperature or liquefied by organic solvents, with more than one free isocyanate group from the group of diisocyanates of the general formula

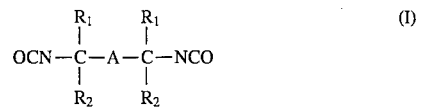

wherein the groups $R_1$ and $R_2$ can in each case be the same or different and wherein $R_1 = -H$ or $-C_nH_{2n+1}$ $R_2 = -C_nH_{2n+1}$ wherein n = a whole number of 1 to 6 and A = a single bond, an aromatic or alicyclic residue, or a linear or branched aliphatic residue with 1 to 12 carbon atoms and/or polyisocyanates derived therefrom, wherein up to 40 wt %, relative to the solids weight of the polyisocyanate component II, can be replaced by one or more polyisocyanates different therefrom, that are liquid at room temperature or liquefied by organic solvents, and have more than one free isocyanate group, wherein the wt % of components I) and II) each relates to its solids content and add up to 100 wt % and wherein component II) is added to the coating agent shortly before its application, and the clear coat layer is applied, after drying or wet-on-wet, to the base coat so obtained and cured, optionally together with the base coat layer.

Component I of the binder used according to the invention is preferably used in an amount of 99 to 90 wt % together with preferably 1 to 10 wt % of component II, the wt % values adding up to 100 wt %.

It has been found that by addition of the special polyisocyanates II defined above to physically-drying, polyurethane-based aqueous base coats of the multicoat structure, that is after overcoating with solvent-containing, in particular two-component, clear coats, especially based on polyacrylate/polyisocyanate, very good hardness of the overall structure, in particular in the case of high layer thicknesses of the base coat, as well as excellent gloss, are obtained.

The usable aqueous, physically drying, polyurethane binders are such as are used for example in aqueous base coats known per se, such as effect lacquers (metallic lacquers and mother-of-pearl lacquers) or solid-colour lacquers based on polyurethane. It is possible in principle to add the polyisocyanate component II to known aqueous base coats that satisfy the above specification of the polyurethane binders.

Examples of usable polyurethane base coats are those containing binders or binder mixtures based on A) one or more carbonate-group-containing polyurethanes with a number-average molecular weight (Mn) of 70,000 to 500,000 and B) one or more other polyurethanes with Mn of 20,000 to 60,000.

Polyurethane base coats of this kind are particularly suitable as effect base coats, e.g. metallic base coats. They contain for example 8 to 30 wt %, relative to the lacquer ready for application, of the above-defined binder mixture A) +B).

The binder mixture can contain 50–90 wt % of the polyurethanes with Mn 70,000 to 500,000 and 10–50 wt % of the polyurethanes with Mn 20,000–60,000, in each case in the form of aqueous dispersions (wherein the wt % relates to the resin solids in each case).

Component A) is obtainable by reaction of a) 10 to 40 wt % of one or more organic polyisocyanates, having no hydrophilic groups or groups convertible to hydrophilic groups, b) 40 to 80 wt % of one or more higher-molecular organic polyhydroxy compounds, having no hydrophilic groups or groups convertible to hydrophilic groups and comprising at least 50 wt % of one or more polyhydroxypolycarbonates, c) 0.2–18 wt % of one or more lower-molecular compounds, having at least two groups reactive towards isocyanate groups, but no hydrophilic groups or groups convertible to hydrophilic groups, d) 1 to 12 wt % of one or more compounds having, in addition to at least one ionic group or at least one group convertible to an ionic group, at least one hydrogen atom reactive towards isocyanate groups, and e) 0 to 8 wt % of one or more non-ionically hydrophilic compounds, having at least one isocyanate group or at least one group reactive towards isocyanate groups.

The polyurethanes used as component A) preferably have at least 200 milliequivalents per 100 g solids of chemically incorporated carbonate groups —O—CO—O—. They preferably contain no more than a total of 320 milliequivalents per 100 g solids of chemically incorporated urethane groups —NH—CO—O— and optionally chemically incorporated urea groups —NH—CO—NH—.

An example of polyurethanes usable as component B) are those obtainable by reaction of a) 10 to 40 wt % of one or more organic polyisocyanates having no hydrophilic groups or groups convertible to hydrophilic groups, b) 40 to 80 wt % of one or more higher-molecular organic polyhydroxy compounds having no hydrophilic groups or groups convertible to hydrophilic groups, c) 0.2 to 18 wt % of one or more lower-molecular compounds having at least two groups reactive towards isocyanate groups, but no hydrophilic groups or groups convertible to hydrophilic groups and d) 1 to 12 wt % of one or more compounds having, in addition to at least one ionic group or at least one group convertible to an ionic group, at least one hydrogen atom reactive towards isocyanate groups.

Polyurethanes of this kind and their production and use in aqueous base coats are described in detail in DE-A-41 15 042.

Another example of the polyurethane binder component I usable according to the invention is binders or binder mixtures based on C) one or more polyurethanes containing carbonate groups and with a glass transition temperature below 0° C. and D) one or more unsaturated reaction products of carboxy-functional polycondensates with ethylenically unsaturated monomers with a glass transition temperature above 0° C. The content of the polyurethanes with the glass transition temperature below 0° C. can be e.g. 50–90 wt % and the content of the unsaturated reaction products with a glass transition temperature above 0° C. can be e.g. 10–50 wt %, in the form of the aqueous dispersions in each case. The wt % values relate in this connection to the binder solids and add up to 100%.

Such binder systems are suitable in particular for the production of solid-colour coatings. Such coatings preferably contain 5 to 30 wt % of the binder or binder mixture, relative to the weight of the coating agent ready for application.

Examples of component C) are those obtainable by reaction of a) 10 to 40 wt % of one or more organic polyisocyanates having no hydrophilic groups or groups convertible to hydrophilic groups, b) 40 to 80 wt % of one or more higher-molecular organic polyhydroxy compounds having no hydrophilic groups or groups convertible to hydrophilic groups and comprising at least 50 wt % of one or more polyhydroxypolycarbonates, c) 0.2 to 18 wt % of one or more lower-molecular compounds having at least two groups reactive towards isocyanate groups, but no hydrophilic groups or groups convertible to hydrophilic groups, d) 1 to 12 wt % of one or more compounds having, in addition to at least one ionic group or at least one group convertible to an ionic group, at least one hydrogen atom reactive towards isocyanate groups, and e) 0 to 8 wt % of one or more non-ionic-hydrophilic compounds having at least one isocyanate group or at least one group reactive towards isocyanate groups.

The polyurethanes used as component C) preferably have at least 200 milliequivalents per 100 g solids of chemically incorporated carbonate groups —O —CO—O—. They preferably contain no more than a total of 320 milliequivalents per 100 g solids of chemically incorporated urethane groups —NH—CO—O— and optionally chemically incorporated urea groups —NH—CO—NH—.

The unsaturated reaction products usable as component D) are obtainable by reaction of f) 5 to 95 wt % of a carboxy-functional polycondensate that in addition contains epoxy groups, g) 95 to 5 wt % of at least one copolymerisable α,β-olefinically unsaturated monomer, and h) 0 to 20 wt % of customary auxiliary substances for polymer production, wherein the quoted amounts of the constituents f) to h) relate to the solids component of component D), and their sum always amounts to 100 wt %.

Polyurethanes or mixtures of this kind and their production and use in aqueous base coats are described in detail in DE-A-41 15 042.

Other examples of polyurethane binders usable according to the invention are those based on acrylated polyurethanes, as described in DE-A-41 22 265. Combinations of the binders mentioned are also possible.

The solid- or metallic-coloured water-based coating agents used according to the invention contain for example about 5 to 35 wt % binder (comprising components I and II), 50 to 85 wt % water, 1 to 20 wt % of one or more water-miscible solvents, e.g. alcohols, such as butanol, isopropanol, glycols, such as butyl glycol, ethylene glycol, aromatic hydrocarbons, such as Solvesso, ether alcohols, such as butoxypropanol, methoxypropanol, methoxypropyl acetate, as well as 0.3–25 wt % pigment, and optionally neutralising agents and customary additives in the required, customary proportions.

The pigments may be opaque, transparent or special-effect pigments. For the formulation of a metallic base coat for example, 0.3–4 wt % of one or more metallic pigments and 0 to 10 wt % of one or more colouring or special-effect pigments are included. For the formulation of solid-colour base coats, 5 to 20 wt % of pigments are preferably included.

The aqueous base coats contain neutralisation agents for the partial neutralisation of neutralisable groups. The degree of neutralisation of neutralisable groups preferably amounts to 40–120 % of the neutralisable groups and is in particular less than 100 %. Examples are bases customary in the lacquer sector, such as ammonia, N,N-dimethylethanolamine or tert.-amines, such as triethylamine, triethanolamine and N-methylmorpholine.

Furthermore, the aqueous base coats optionally contain customary additives such as are used in the lacquer sector. Such auxiliary substances and additives are thickeners, additives influencing the rheology, antifoaming agents and corrosion inhibitors (for example for inhibition of the gassing of metallic pigments). The additives and auxiliary substances are added in customary amounts, familiar to the person skilled in the art.

For the process according to the invention, aqueous base coats containing all components except the polyisocyanate components II are first prepared. To the aqueous base coats, thus partially complete, there is added according to the invention, not until shortly before application, 0.5–15 wt %, preferably 1–10 wt %, relative to the solids component of the binder, of one or more sterically hindered polyisocyanates with more than one free isocyanate group from the group of diisocyanates of the general formula

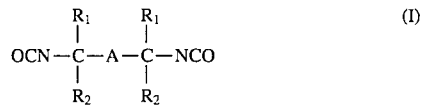

and/or polyisocyanates derived therefrom with more than one free isocyanate group, wherein the residues $R_1$ and $R_2$ can each be the same or different and $R_1$=H or preferably —$C_nH_{2n+1}$, $R_2$=—$C_nH_{2n+1}$;

wherein n= a whole number from 1 to 12, preferably 1 to 4, and

A= a single bond, an aromatic or alicyclic residue, or is a linear or branched aliphatic residue with 1 to 12 carbon atoms, that can be present in the mixture at up to 40 wt %, relative to the solids content of the total polyisocyanates, of one or more polyisocyanates with more than one free isocyanate group, that are liquid at room temperature or are liquefied by the addition of organic solvents.

The aromatic residues A have for example 6 or 10 C atoms; an example is the phenylene residue. Alicyclic residues A have for example 5 or 6 C atoms; the cyclohexylene residue is preferred. The aromatic and alicyclic residues can be unsubstituted or substituted, for example by one or more alkyl residues with 1 to 4 C atoms.

The compounds most preferably included are sterically hindered polyisocyanates with 4 to 25, preferably 4 to 16, C atoms, that contain in the 2-position to the NCO group one or two linear, branched or cyclic alkyl groups with 1 to 12, preferably 1 to 4 C, atoms.

The di- and polyisocyanates are preferably liquid at room temperature. At room temperature (23° C.), the liquid or liquefied polyisocyanates preferably have a viscosity of 1 to 6000 mPa.s, preferably above 5 and below 3000 mPa.s, most preferably above 5 and below 1000 mPa.s. The average functionality of the polyisocyanates is preferably 1.5 to 5 reactive isocyanate groups per molecule, most preferably at least 2 and not more than 3. They preferably have an NCO content of above 5 wt %, preferably below 35 wt %, most preferably below 25 wt %.

The polyisocyanates derived from the diisocyanates of general formula I are for example NCO-containing prepolymers that can be obtained from the diisocyanates by reaction with low-molecular polar compounds. The emulsifiability can be increased for example by incremental incorporation of polyethylene oxide residues or ionisable groups.

Further examples of the polyisocyanates derived from the diisocyanates of general formula I are higher homologues or modified derivatives thereof.

Higher homologues of the sterically hindered diisocyanates according to formula I can be obtained for example by reaction of excess diisocyanate with water, polyhydric polyalcohols, such as glycerol, trimethylolpropane, pentaerythritol or suitable OH-oligomers, and subsequent removal by distillation of the unreacted excess of diisocyanate. Other usable polyisocyanates are uretdiones or isocyanurates of the diisocyanates. During their production, polyisocyanates having mixtures of uretdione and/or isocyanurate groups are formed, according to the catalyst selected. An example of a further modification route is the reaction with defined amounts of water, with formation of biurets.

In the modification of the sterically hindered diisocyanates of general formula I, normal, that is to say sterically unhindered, polyisocyanates can be co-utilised in the mixture. In this case, up to 40 wt % of sterically unhindered diisocyanates are preferably used in the mixture, the wt % relating to the total polyisocyanates. A suitable prepolymer according to the invention can also be obtained by copolymerization of a compound that contains, in addition to a double bond polymerizable by the radical or ionic mechanism, at least one sterically hindered isocyanate group, as for example allyl monoisocyanate, vinylphenyl isocyanate, (meth) acrylic acid-β-isocyanatoethyl ester, (meth)acryloyl isocyanate or preferably m- or p-isopropenyldimethylbenzyl isocyanate. For improvement of the emulsifiability, the polyisocyanates can be modified with hydrophilic groups, such as carboxyl groups or polyether groups.

Examples of the usable sterically hindered diisocyanates are 1,1,6,6-tetramethylhexamethylene diisocyanate, 1,6-dibutylpentamethylene-1,5-diisocyanate, 1,4-dimethyl-cyclohexane-1,4-diisocyanate, p- or m-tetramethylxylylene diisocyanate of the formulae

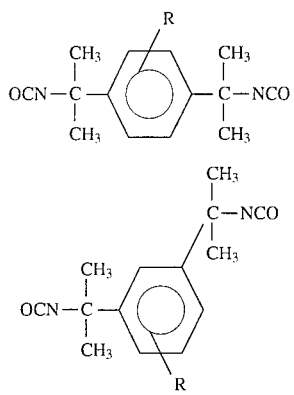

wherein R signifies H or $C_1$–$C_4$-alkyl and the corresponding hydrogenated homologues. These diisocyanates can also be converted to higher-functional compounds, for example by trimerisation to isocyanurates, or by reaction with water or with trimethylolpropane. Tetramethylxylyl diisocyanate and its reaction product with trimethylolpropane are particularly preferred.

The polyisocyanate component can be present as a mixture of various polyisocyanates, e. as any mixture of the di- and polyisocyanates aforementioned as examples. Mixtures of di- and higher-functional polyisocyanates are preferred.

The sterically hindered diisocyanates of general formula I and the polyisocyanates derived therefrom can be present in a mixture with one or more polyisocyanates having more than one free isocyanate group. Those whose isocyanate groups are unhindered are preferred here. They are any organic polyisocyanates with aliphatically, cycloaliphatically, araliphatically and/or aromatically bonded free isocyanate groups, that are liquid at room temperature, as can optionally be brought about by addition of organic solvents. They are preferably polyisocyanates or polyisocyanate mixtures with exclusively aliphatically and/or cycloaliphatically bonded isocyanate groups with an average NCO functionality of 1.5 to 5, preferably 2 to 3.

The above described polyisocyanates or their mixtures are preferably predissolved in suitable organic solvents before addition to the aqueous base coats mentioned. The solvents should be water-miscible and well emulsifiable in water, but should not react with isocyanates or only do so very slowly. Suitable solvents are for example glycol dialkyl ethers such as glycol dimethyl ether, esters such as ethyl glycol acetate, ketones such as acetone or dioxane or N-methylpyrrolidone. Preferred solvents are alcohols with sterically hindered alcohol groups, ketone alcohols or alkoxyalkanols such as butoxyethanol, butyldiglycol, methoxyisopropanol or diacetone alcohol are preferred.

With these solvents, there is preferably prepared, shortly before use and without heating, a polyisocyanate solution, which, at a solids content of more than 40 wt %, preferably 50–95 wt %, has a viscosity of 0.5 to 2000 mPa.s, preferably 1–20 mPa.s.

The polyisocyanate solution or corresponding liquid polyisocyanates are added, e.g. while stirring, to the aqueous base coat immediately before application. The aqueous base coat so modified has a pot life of 1 to 6 hours.

Application outside the pot life can lead to blistering in the applied coating.

The modified base coating agent used according to the invention can be applied to various substrates by customary coating processes, for example by spraying, brushing or doctor application. Various materials come into consideration as substrates, such as metals, plastics and wood. Metals are preferred. These substrates can also be subjected to a pretreatment, as for example a priming, as well as to the application of other coats customary in the multicoat system, such as filler coats, surfacer coats and interlayers.

The modified aqueous base coats used according to the invention are physically drying, that is they require no storing and can be dried for example at temperatures of 20° to 60° C. After application, they may be coated with transparent finishes. The coating may be carried out wet-on-wet, after a short flashing-off or after drying of the layer of base coat. The drying of the clear coat layer may occur together with that of the base coat layer. As possible clear coats, customary solvent-containing two-component lacquers based on polyacrylate/polyisocyanate are preferred. Such clear coats are described for example in EP-A-0 320 719 and DE-A-37 31 652, and EP-A-0 012 98 13.

Through the use of the sterically hindered di- and polyisocyanates, a particularly good workability into the base coats is obtained; the homogeneity is considerably better than when using sterically unhindered di- and polyisocyanates. When the latter are used, specking occurs; in addition, the pot lives achieved are only short.

With the polyurethane-based aqueous base coats modified according to the invention, very good hardnesses, especially at high layer thicknesses of the base coat layer of 40–50 μm, and excellent gloss are achieved in the multicoat system. The quality of such a multicoat lacquer finish is comparable with a corresponding multicoat system based on conventional base coats.

The aqueous base coats modified according to the invention are used in industrial, vehicle and vehicle part lacquering for coatings for metal and plastic. The aqueous coating agents are preferably used in vehicle repair lacquering and in the original lacquering of vehicles or vehicle parts, especially of automobiles and commercial vehicles, with room temperature or forced drying.

The invention will be explained in more detail by means of the following examples and comparative examples.

PREPARATIVE EXAMPLE 1

Aqueous polyurethane dispersion

In a reaction vessel with stirrer, internal thermometer, heater and reflux condenser, 250 g of a linear polyester (synthesised from adipic acid, isophthalic acid and hexanediol, OH number 77, acid number 10) are heated with 80 g methyl ethyl ketone and 53.3 g N-methylpyrrolidone to 70° C., and at this temperature 74 g hydrogenated bisphenol A and 28.3 g dimethylolpropionic acid are added. The batch is heated to 120° C. and stirred for half an hour at this temperature. 146.7 g hexamethylene diisocyanate are then added at 70° C. After an exothermic phase (temperature <90° C.), the batch is maintained at 70° C. until the residual values of the isocyanate number are below 1.8. The hot resin mixture is dispersed in 891 g of deionised water and 23.5 g triethylamine with powerful stirring. Five minutes after the end of the resin addition, 10.5 g 1,3-propylenediamine in 75 g deionised water are added and the charge stirred for a further 1 hour.

A translucent aqueous dispersion results, with the following characteristics:

| | |
|---|---|
| solids content | 30% |
| viscosity (20° C.) | 109 mPa · s |
| pH value | 9.8 |
| acid value | 27 (mg KOH per g solid resin) |
| Mn | 34,000 |

PREPARATIVE EXAMPLE 2

Preparation of a modified metallic aqueous base coat usable according to the invention From the aqueous polyurethane dispersion prepared in Preparative Example 1 a metallic aqueous base coat is prepared with the following constituents:

35.5 parts of the dispersion according to Preparative Example 1

47.7 parts water 2.0 parts n-butanol 8.1 parts butylglycol 0.3 parts of an ordinary commercial corrosion inhibitor for the prevention of aluminium gassing 2.1 parts of an ordinary commercial thickener 0.2 parts N,N-dimethylethanolamine 4.1 parts of an ordinary commercial aluminium paste, 60 % Al (The data refer to weight)

A metallic base coat results, with a viscosity of ca. 30 s (DIN cup, 4 mm nozzle, 23° C.) and a solids content of 15.9 %.

Subsequently a polyisocyanate solution is prepared by mixing the following constituents:

40 parts glycol dimethyl ether 60 parts TMXDI

Immediately before the processing, 8 wt % of the polyisocyanate solution, relative to the solids content of the binder, is added to the metallic aqueous base coat.

PREPARATIVE EXAMPLE 3

Preparation of a modified solid aqueous base coat usable according to the invention From the aqueous polyurethane dispersion prepared in Preparative Example 1, a solid aqueous base coat is prepared with the following constituents:

35.5 parts of the dispersion according to Preparative Example 1

21.1 parts water 12.1 parts butylglycol 1.3 parts of an ordinary commercial thickener 0.14 parts N,N-dimethylethanolamine 22.1 parts of an ordinary commercial titanium dioxide pigment 0.5 parts of an ordinary commercial copper phthalocyanine pigment 0.16 parts of an ordinary commercial antifoaming agent 8.1 parts of an ordinary commercial polyurethane milling auxiliary agent (The data refer to weight)

The resulting solid base coat has a viscosity of ca. 45 s (DIN cup, 4 mm nozzle, 23° C.) and a solids content of 39.8%

Subsequently a polyisocyanate solution is prepared by mixing the following constituents:

40 parts glycol dimethyl ether 60 parts TMXDI

Immediately before use, 8 wt % of the polyisocyanate solution, relative to the solids content of the binder, is added to the solid aqueous base coat.

COMPARATIVE TEST A

A metallic aqueous base coat is prepared according to Preparative Example 2, but without addition of the polyisocyanate solution.

APPLICATION EXAMPLE 5

With the aqueous base coats prepared in Preparative Examples 2 and 3 and Comparative Test A, lacquering is carried out as follows:

Lacquering system of the sheets for evaluation

Smooth-ground automobile-body sheet iron

Ordinary practical 2-component epoxy etch primer

Ordinary practical 2-component polyurethane filler

Aqueous base coat

Ordinary practical 2-component polyurethane clear coat (acrylate base), medium-solid type, 47 % solids by weight.

APPLICATION AND DRYING

Spray application of the aqueous base coat 40 minutes predrying at room temperature Spray application of the clear coat 10 minutes flashing-off at room temperature 45 minutes drying at 60° C.

COMPARATIVE TEST B

In order to compare with a conventional base coat, an additional application is carried out. The procedure in this case accords with Application Example 5, but instead of the aqueous base coats, an ordinary conventional base coat based on cellulose acetobutyrate (CAB) acrylate is applied. Predrying is carried out for 15 minutes at room temperature. After application of the clear coat there is a flashing-off of 10 minutes at room temperature and 45 minutes drying at 60° C.

The properties of the lacquer finishes obtained are assembled in the following table:

|  | Aqueous base coat Preparative Example 1 | | Aqueous base coat Comparative Test A) | | Solvent-containing base coat (Comparative Test B) | |
|---|---|---|---|---|---|---|
|  | metallic | solid | metallic | solid | metallic | solid |
| Gloss | 2 | 2 | 2–3 | 3 | 2 | 2 |
| Hardness | | | | | | |
| after 5 hours | 3 | 3–4 | 3–4 | 4 | 3 | 3 |
| after 3 days | 2 | 2–3 | 3 | 3–4 | 2 | 2–3 |
| after 7 days | 1–2 | 2 | 3 | 3 | 1 | 1–2 |

Evaluation
1 = very good
2 = good
3 = usable to a limited extent
4 = unsatisfactory

COMPARATIVE TEST C

The advantages of the use according to the invention of sterically hindered di- and polyisocyanates is evident from the following comparison.

To two samples of the metallic aqueous base coat obtained according to Preparative Example 2 there is added in one case 10 wt % (relative to the solids portion of the binder) of a solution of 40 parts by weight of glycol dimethyl ether and 60 parts by weight of tetramethylxylylene diisocyanate (sterically hindered diisocyanate); and in the other case 10 wt % of a solution of 40 parts by weight of glycol dimethyl ether and 60 parts by weight of an ordinary commercial, sterically unhindered polyisocyanate (uretdione based on hexane diisocyanate, commercial product Desmodur 2550). On addition of the solution containing tetramethylxylylene diisocyanate, the batch is still homogeneous and of low viscosity after 14 hours; the mixture has a long pot life. The mixture to which the solution of the sterically unhindered polyisocyanate has been added begins to evolve gas after 30 minutes, and after 12 hours the batch gels.

We claim:

1. A process for applying a multicoat lacquer finish to a substrate, which comprises applying to the substrate a base coat layer containing water, a binder, a pigment, and optionally an organic solvent, a neutralizing agent, and a laquer additive, wherein the binder comprises
   (I) 85 to 99.5 weight percent based on the solids content of the binder of an aqueous, physically drying polyurethane binder with an OH group content not to exceed an OH number of 10, and acid function content not to exceed an acid number of 30, wherein from 10 to 50 weight percent of the component (I) is optionally one or more unsaturated reaction products of carboxy functional polycondensates with ethylenically unsaturated monomers, and
   (II) 0.5 to 15 weight percent based on the solids content of the binder of a polyisocyanate that is liquid at room temperature or is liquefied by an organic solvent, containing more than one free isocyanate group having the formula

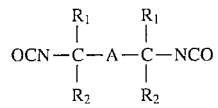

wherein
$R_1$ and $R_2$ are independently of each other —$C_nH_{2n+1}$, or $R_1$ is H,
n is a cardinal number from 1 to 6, and
A is a single bond, an aromatic or alicyclic residue, or a linear or branched aliphatic residue or a polyisocyanate derived therefrom, wherein up to 40 percent based on the weight of the solids of the polyisocyanate component II, is optionally a different polyisocyanate that is liquid at room temperature or is liquefied by an organic solvent and has more than one free isocyanate group, wherein the component (II) is mixed with the base coat before the application thereof to the substrate, and applying a clear coat containing an organic solvent over the aqueous base coat while the latter is still wet or after it has dried.

2. The process of claim 1 wherein said binder used has its component I comprising a polyurethane binder obtained by reaction of:
   a) 10 to 40 wt % of one or more organic polyisocyanates that are free from hydrophilic groups or groups convertible to hydrophilic groups,
   b) 40 to 80 wt % of one or more organic polyhydroxy compounds, that are free from hydrophilic groups or groups convertible to hydrophilic groups and comprise at least 50 wt %, relative to their solids content, of one or more polyhydroxypolycarbonates,
   c) 0.2–18 wt % of one or more compounds having at least two groups reactive towards isocyanate groups, and free from hydrophilic groups or groups convertible to hydrophilic groups,
   d) 1 to 12 wt % of one or more compounds having, in addition to at least one ionic group or at least one group convertible to an ionic group, at least one hydrogen atom reactive towards isocyanate groups, and
   e) 0 to 8 wt % of one or more non-ionically hydrophilic compounds, having at least one isocyanate group or at least one group reactive towards isocyanate groups.

3. Process according to claim 2, characterised in that for the production of the base coat layer said binder is used wherein the component I) contains, relative to its solids weight, 50 to 90 wt % of said polyurethane binder of claim 2 with a number-average molecular weight (Mn) of 70,000 to 500,000, and in addition to said polyurethane binder, 10 to 50 wt % of one or more polyurethane binders with a number-average molecular weight (Mn) of 20,000 to 60,000.

4. Process according to claim 3, characterised in that for the production of the base coat layer a binder is used whose component B is obtained by reaction of
   a) 10 to 40 wt % of one or more organic polyisocyanates that are free from hydrophilic groups or groups convertible to hydrophilic groups,
   b) 40 to 80 wt % of one or more organic polyhydroxy compounds that are free from hydrophilic groups or groups convertible to hydrophilic groups,
   c) 0.2 to 18 wt % of one or more compounds having at least two groups reactive towards isocyanate groups and free from hydrophilic groups or groups convertible to hydrophilic groups and d) 1 to 12 wt % of one or more compounds having, in addition to at least one ionic group or at least one group convertible to an ionic group, at least one hydrogen atom reactive towards isocyanate groups.

5. Process according to claim 2, characterised in that for the production of the base coat layer a binding is used whose component I) contains, relative to its solids weight, 50 to 40 wt % of component A) with a glass transition temperature below 0° C. and additionally 10 to 50 wt % of one or more unsaturated reaction products of carboxy-functional polycondensates with ethylenically unsaturated monomers with a glass transition temperature above 0° C. (component C).

6. Process according to claim 5, characterised in that for the production of the base coat layer a binding is used whose component C) is obtainable by reaction of f) 5 to 95 wt % of one or more carboxy-functional polycondensates that contain epoxy groups, g) 95 to 5 wt % of one or more copolymerisable α,β-olefinically unsaturated monomers, and h) 0 to 20 wt % of customary auxiliary substances for polymer production.

7. Process according to claim 1, characterised in that for the production of the base coat layer a binder is used wherein component II) is a polyisocyanate derived from a diisocyanate of general formula I) according to claim 1, and is a prepolymer, containing isocyanate groups, of the diisocyanates of general formula I by reaction with low-molecular polar compounds, a higher homologue of the diisocyanates of general formula I, obtained by reaction with water and polyhydric polyalcohols or a uretdione of the diisocyanates of general formula I, or a biuret obtained by reaction of the diisocyanates of general formula I with water.

* * * * *